(12) United States Patent
Chui et al.

(10) Patent No.: US 11,972,522 B2
(45) Date of Patent: Apr. 30, 2024

(54) ARBITRARY VIEW GENERATION

(71) Applicant: Outward, Inc., San Jose, CA (US)

(72) Inventors: Clarence Chui, Los Altos Hills, CA (US); Manu Parmar, Sunnyvale, CA (US); Brook Aaron Seaton, San Jose, CA (US); Himanshu Jain, New Brunswick, NJ (US)

(73) Assignee: Outward, Inc., San Jose, CA (US)

( * ) Notice: Subject to any disclaimer, the term of this patent is extended or adjusted under 35 U.S.C. 154(b) by 766 days.

(21) Appl. No.: 17/089,597

(22) Filed: Nov. 4, 2020

(65) Prior Publication Data

US 2021/0118219 A1 Apr. 22, 2021

Related U.S. Application Data

(63) Continuation-in-part of application No. 16/171,221, filed on Oct. 25, 2018, now Pat. No. 10,909,749, which is a continuation of application No. 15/721,421, filed on Sep. 29, 2017, now Pat. No. 10,163,249, which is a continuation-in-part of
(Continued)

(51) Int. Cl.
| | |
|---|---|
| *G06K 9/36* | (2006.01) |
| *G06T 5/50* | (2006.01) |
| *G06T 7/32* | (2017.01) |
| *G06T 15/20* | (2011.01) |
| *G06T 17/00* | (2006.01) |

(52) U.S. Cl.
CPC .............. *G06T 15/205* (2013.01); *G06T 5/50* (2013.01); *G06T 7/32* (2017.01); *G06T 17/00* (2013.01)

(58) Field of Classification Search
CPC ... G06T 15/205; G06T 7/0051; G06T 7/0065; G06T 7/0077; G06T 7/0075; G06T 5/005; G06T 2207/10028; G06T 2207/10024; G06T 3/4038; G06T 11/60; H04N 1/3876; H04N 5/23238; G06K 2009/2045
See application file for complete search history.

(56) References Cited

U.S. PATENT DOCUMENTS

| | | |
|---|---|---|
| 6,222,947 B1 | 4/2001 | Koba |
| 6,377,257 B1 | 4/2002 | Borrel |
| 8,655,052 B2 | 2/2014 | Spooner |
| (Continued) | | |

FOREIGN PATENT DOCUMENTS

| | | |
|---|---|---|
| CN | 101281640 | 6/2012 |
| CN | 203870604 | 10/2014 |
| (Continued) | | |

OTHER PUBLICATIONS

Daniel Scharstein. "A Survey of Image-Based Rendering and Stereo". In: "View Synthesis Using Stereo Vision", Lecture Notes in Computer Science, vol. 1583, Jan. 1, 1999, pp. 23-39.
(Continued)

*Primary Examiner* — Duy M Dang
(74) *Attorney, Agent, or Firm* — Van Pelt, Yi & James LLP

(57) ABSTRACT

Techniques for generating an arbitrary view or perspective of an ensemble scene are disclosed. In some embodiments, in response to a received request for a prescribed perspective of an ensemble scene comprising a plurality of assets, an output image of the ensemble scene for the requested prescribed perspective is generated based at least in part on combining at least a portion of an existing image of each of at least a subset of the plurality of assets.

69 Claims, 11 Drawing Sheets

Related U.S. Application Data application No. 15/081,553, filed on Mar. 25, 2016, now Pat. No. 9,996,914.

(60) Provisional application No. 62/933,254, filed on Nov. 8, 2019, provisional application No. 62/541,607, filed on Aug. 4, 2017.

(56) References Cited

U.S. PATENT DOCUMENTS

| | | |
|---|---|---|
| 9,407,904 B2 | 8/2016 | Sandrew |
| 2005/0018045 A1 | 1/2005 | Thomas |
| 2006/0280368 A1 | 12/2006 | Petrich |
| 2008/0143715 A1 | 6/2008 | Moden |
| 2009/0028403 A1 | 1/2009 | Bar-Aviv |
| 2011/0001826 A1 | 1/2011 | Hongo |
| 2012/0120240 A1 | 5/2012 | Muramatsu |
| 2012/0140027 A1 | 6/2012 | Curtis |
| 2012/0163672 A1 | 6/2012 | McKinnon |
| 2012/0314937 A1 | 12/2012 | Kim |
| 2013/0100290 A1 | 4/2013 | Sato |
| 2013/0259448 A1 | 10/2013 | Stankiewicz |
| 2014/0198182 A1 | 7/2014 | Ward |
| 2014/0254908 A1 | 9/2014 | Strommer |
| 2014/0267343 A1 | 9/2014 | Arcas |
| 2015/0169982 A1 | 6/2015 | Perry |
| 2015/0317822 A1 | 11/2015 | Haimovitch-Yogev |
| 2017/0103512 A1 | 4/2017 | Mailhe |
| 2017/0278251 A1 | 9/2017 | Peeper |
| 2017/0304732 A1 | 10/2017 | Velic |
| 2017/0334066 A1 | 11/2017 | Levine |
| 2017/0372193 A1 | 12/2017 | Mailhe |
| 2018/0012330 A1 | 1/2018 | Holzer |
| 2019/0325621 A1 | 10/2019 | Wang |

FOREIGN PATENT DOCUMENTS

| | | |
|---|---|---|
| JP | 2000137815 | 5/2000 |
| JP | 2003187261 | 7/2003 |
| JP | 2004287517 | 10/2004 |
| JP | 2009211335 | 9/2009 |
| JP | 2010140097 | 6/2010 |
| JP | 2017212593 | 11/2017 |
| JP | 2018081672 | 5/2018 |
| KR | 20060029140 | 4/2006 |
| KR | 20120137295 | 12/2012 |
| KR | 20140021766 | 2/2014 |
| WO | 2018197984 | 11/2018 |
| WO | 2019167453 | 9/2019 |

OTHER PUBLICATIONS

Namoto et al. "Virtual Viewpoint Replay for a Soccer Match by View Interpolation from Multiple Cameras". IEEE Transactions on Multimedia, vol. 9 No. 6, Oct. 1, 2007, pp. 1155-1166.

Sun et al. "An overview of free viewpoint Depth-Image-Based Rendering (DIBR)." Proceedings of the Second APSIPA Annual Summit and Conference. Dec. 14, 2010, pp. 1-8.

Bouwmans et al.: "Deep neural network concepts for background subtraction: A systematic review and comparative evaluation", Neural Networks, Elsevier Science Publishers, Barking, GB, vol. 117, May 15, 2019 (May 15, 2019), pp. 8-66.

Ledig et al., "Photo-Realistic Single Image Super-Resolution Using a Generative Adversarial Network", Sep. 15, 2016 (Sep. 15, 2016), Retrieved from the Internet: URL:https://arxiv.org/pdf/1609.04802.pdf.

Stamatios Lefkimmiatis: "Non-local Color Image Denoising with Convolutional Neural Networks", IEEE Conference On Computer Vision and Pattern Recognition (CVPR 2017), Jul. 1, 2017 (Jul. 1, 2017), pp. 5882-5891, ISBN: 978-1-5386-0457-1, Retrieved from the Internet: URL: https://arxiv.org/pdf/1611.06757.pdf>.

ARBITRARY VIEW GENERATION

CROSS REFERENCE TO OTHER APPLICATIONS

This application is a continuation-in-part of U.S. patent application Ser. No. 16/171,221, now U.S. Pat. No. 10,909,749, entitled ARBITRARY VIEW GENERATION filed Oct. 25, 2018, which is a continuation of U.S. patent application Ser. No. 15/721,421, now U.S. Pat. No. 10,163,249, entitled ARBITRARY VIEW GENERATION filed Sep. 29, 2017, which is a continuation-in-part of U.S. patent application Ser. No. 15/081,553, now U.S. Pat. No. 9,996,914, entitled ARBITRARY VIEW GENERATION filed Mar. 25, 2016, all of which are incorporated herein by reference for all purposes. U.S. patent application Ser. No. 15/721,421, now U.S. Pat. No. 10,163,249, furthermore claims priority to U.S. Provisional Patent Application No. 62/541,607 entitled FAST RENDERING OF ASSEMBLED SCENES filed Aug. 4, 2017, which is incorporated herein by reference for all purposes.

This application claims priority to U.S. Provisional Patent Application No. 62/933,254 entitled QUANTIZED PERSPECTIVE CAMERA VIEWS filed Nov. 8, 2019, which is incorporated herein by reference for all purposes.

BACKGROUND OF THE INVENTION

Existing rendering techniques face a trade-off between competing objectives of quality and speed. A high quality rendering requires significant processing resources and time. However, slow rendering techniques are not acceptable in many applications, such as interactive, real-time applications. Lower quality but faster rendering techniques are typically favored for such applications. For example, rasterization is commonly employed by real-time graphics applications for relatively fast renderings but at the expense of quality. Thus, improved techniques that do not significantly compromise either quality or speed are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for generating an arbitrary view of a scene are disclosed. The paradigm described herein entails very low processing or computational overhead while still providing a high definition output, effectively eliminating the challenging trade-off between rendering speed and quality. The disclosed techniques are especially useful for very quickly generating a high quality output with respect to interactive, real time graphics applications. Such applications rely on substantially immediately presenting a preferably high quality output in response to and in accordance with user manipulations of a presented interactive view or scene.

Figure 1:
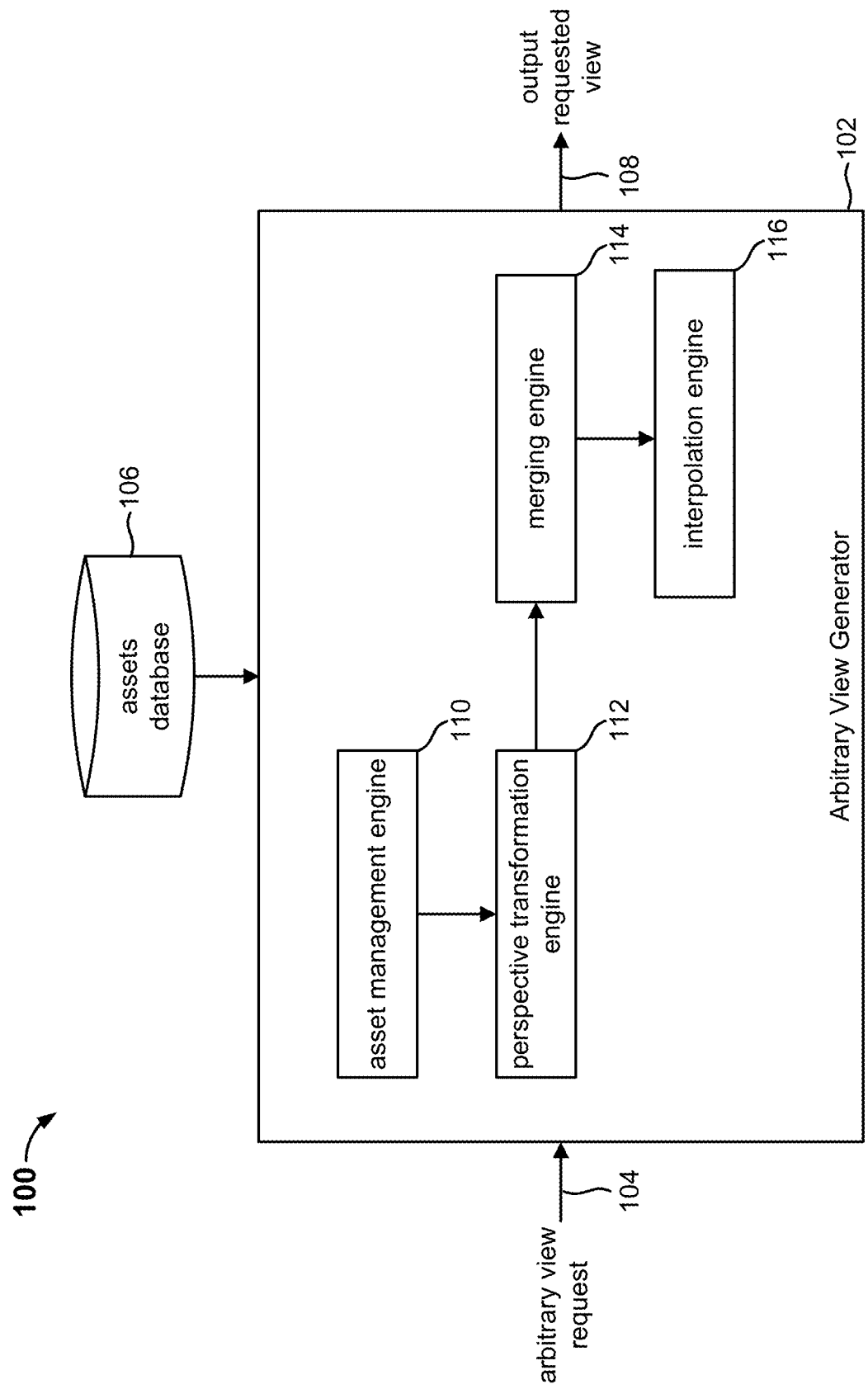
FIG. 1 is a high level block diagram illustrating an embodiment of a system for generating an arbitrary view of a scene.

FIG. 1 is a high level block diagram illustrating an embodiment of a system 100 for generating an arbitrary view of a scene. As depicted, arbitrary view generator 102 receives a request for an arbitrary view as input 104, generates the requested view based on existing database assets 106, and provides the generated view as output 108 in response to the input request. In various embodiments, arbitrary view generator 102 may comprise a processor such as a central processing unit (CPU) or a graphical processing unit (GPU). The depicted configuration of system 100 in FIG. 1 is provided for the purposes of explanation. Generally, system 100 may comprise any other appropriate number and/or configuration of interconnected components that provide the described functionality. For example, in other embodiments, arbitrary view generator 102 may comprise a different configuration of internal components 110-116, arbitrary view generator 102 may comprise a plurality of parallel physical and/or virtual processors, database 106 may comprise a plurality of networked databases or a cloud of assets, etc.

Arbitrary view request 104 comprises a request for an arbitrary perspective of a scene. In some embodiments, the requested perspective of the scene does not already exist in an assets database 106 that includes other perspectives or viewpoints of the scene. In various embodiments, arbitrary view request 104 may be received from a process or a user. For example, input 104 may be received from a user interface in response to user manipulation of a presented scene or portion thereof, such as user manipulation of the camera viewpoint of a presented scene. As another example, arbitrary view request 104 may be received in response to a specification of a path of movement or travel within a virtual environment, such as a fly-through of a scene. In some embodiments, possible arbitrary views of a scene that may be requested are at least in part constrained. For example, a user may not be able to manipulate the camera viewpoint of a presented interactive scene to any random position but rather is constrained to certain positions or perspectives of the scene.

Database 106 stores a plurality of views of each stored asset. In the given context, an asset refers to a specific scene whose specification is stored in database 106 as a plurality of views. In various embodiments, a scene may comprise a single object, a plurality of objects, or a rich virtual environment. Specifically, database 106 stores a plurality of images corresponding to different perspectives or viewpoints of each asset. The images stored in database 106 comprise high quality photographs or photorealistic renderings. Such high definition, high resolution images that populate database 106 may be captured or rendered during offline processes or obtained from external sources. In some embodiments, corresponding camera characteristics are stored with each image stored in database 106. That is, camera attributes such as relative location or position, orientation, rotation, depth information, focal length, aperture, zoom level, etc., are stored with each image. Furthermore, camera lighting information such as shutter speed and exposure may also be stored with each image stored in database 106.

Figure 2:
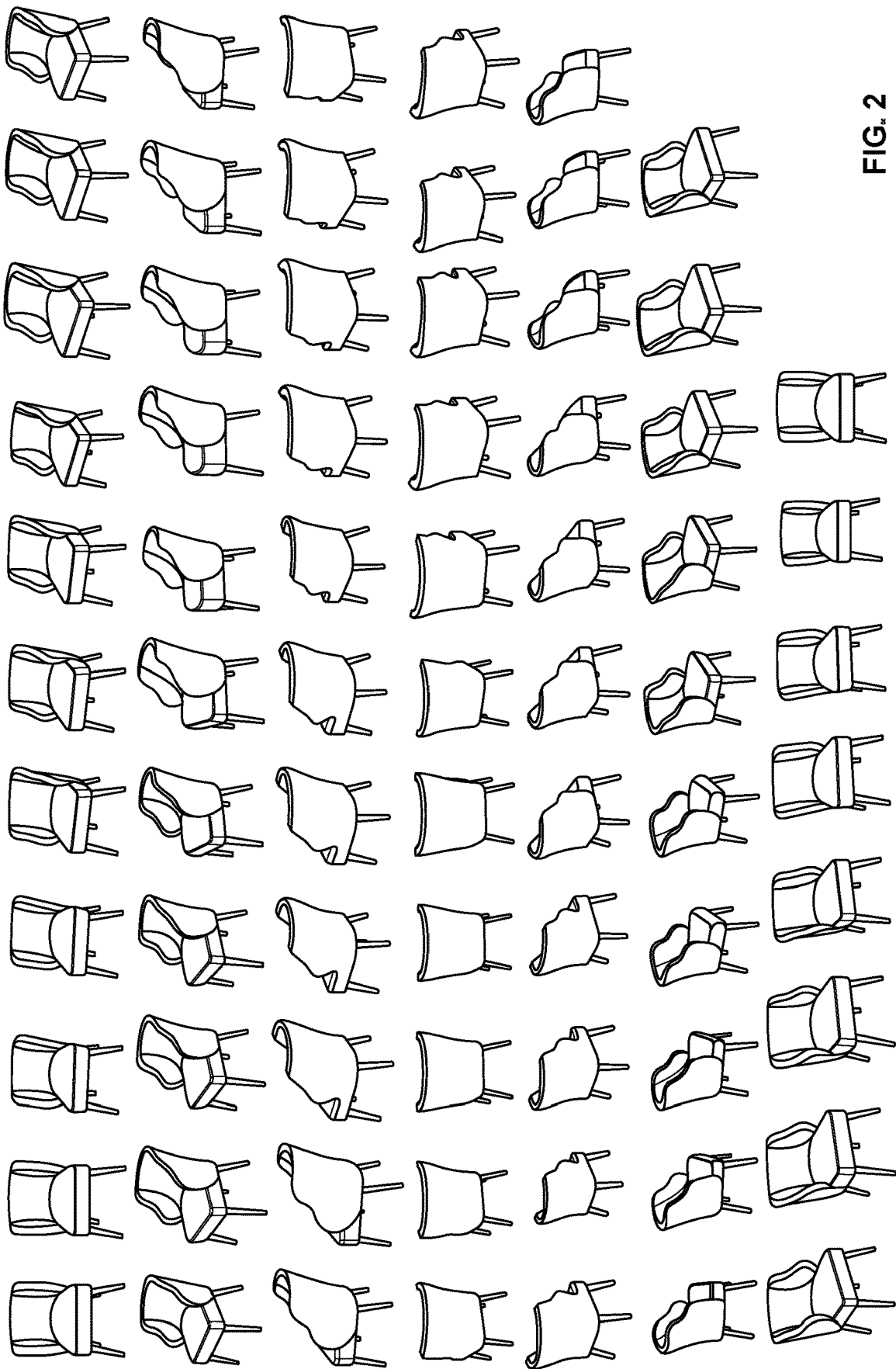
FIG. 2 illustrates an example of a database asset.

In various embodiments, any number of different perspectives of an asset may be stored in database 106. FIG. 2 illustrates an example of a database asset. In the given example, seventy-three views corresponding to different angles around a chair object are captured or rendered and stored in database 106. The views may be captured, for example, by rotating a camera around the chair or rotating the chair in front of a camera. Relative object and camera location and orientation information is stored with each generated image. FIG. 2 specifically illustrates views of a scene comprising a single object. Database 106 may also store a specification of a scene comprising a plurality of objects or a rich virtual environment. In such cases, multiple views corresponding to different locations or positions in a scene or three-dimensional space are captured or rendered and stored along with corresponding camera information in database 106. Generally, images stored in database 106 may comprise two or three dimensions and may comprise stills or frames of an animation or video sequence.

In response to a request for an arbitrary view of a scene 104 that does not already exist in database 106, arbitrary view generator 102 generates the requested arbitrary view from a plurality of other existing views of the scene stored in database 106. In the example configuration of FIG. 1, asset management engine 110 of arbitrary view generator 102 manages database 106. For example, asset management engine 110 may facilitate storage and retrieval of data in database 106. In response to a request for an arbitrary view of a scene 104, asset management engine 110 identifies and obtains a plurality of other existing views of the scene from database 106. In some embodiments, asset management engine 110 retrieves all existing views of the scene from database 106. Alternatively, asset management engine 110 may select and retrieve a subset of the existing views, e.g., that are closest to the requested arbitrary view. In such cases, asset management engine 110 is configured to intelligently select a subset of existing views from which pixels may be harvested to generate the requested arbitrary view. In various embodiments, multiple existing views may be retrieved by asset management engine 110 together or as and when they are needed by other components of arbitrary view generator 102.

The perspective of each existing view retrieved by asset management engine 110 is transformed into the perspective of the requested arbitrary view by perspective transformation engine 112 of arbitrary view generator 102. As previously described, precise camera information is known and stored with each image stored in database 106. Thus, a perspective change from an existing view to the requested arbitrary view comprises a simple geometric mapping or transformation. In various embodiments, perspective transformation engine 112 may employ any one or more appropriate mathematical techniques to transform the perspective of an existing view into the perspective of an arbitrary view. In the cases in which the requested view comprises an arbitrary view that is not identical to any existing view, the transformation of an existing view into the perspective of the arbitrary view will comprise at least some unmapped or missing pixels, i.e., at angles or positions introduced in the arbitrary view that are not present in the existing view.

Pixel information from a single perspective-transformed existing view will not be able to populate all pixels of a different view. However, in many cases, most, if not all, pixels comprising a requested arbitrary view may be harvested from a plurality of perspective-transformed existing views. Merging engine 114 of arbitrary view generator 102 combines pixels from a plurality of perspective-transformed existing views to generate the requested arbitrary view. Ideally, all pixels comprising the arbitrary view are harvested from existing views. This may be possible, for example, if a sufficiently diverse set of existing views or perspectives of the asset under consideration is available and/or if the requested perspective is not too dissimilar from the existing perspectives.

Any appropriate techniques may be employed to combine or merge pixels from a plurality of perspective-transformed existing views to generate the requested arbitrary view. In one embodiment, a first existing view that is closest to the requested arbitrary view is selected and retrieved from database 106 and transformed into the perspective of the requested arbitrary view. Pixels are then harvested from this perspective-transformed first existing view and used to populate corresponding pixels in the requested arbitrary view. In order to populate pixels of the requested arbitrary view that were not available from the first existing view, a second existing view that includes at least some of these remaining pixels is selected and retrieved from database 106 and transformed into the perspective of the requested arbitrary view. Pixels that were not available from the first existing view are then harvested from this perspective-transformed second existing view and used to populate corresponding pixels in the requested arbitrary view. This process may be repeated for any number of additional existing views until all pixels of the requested arbitrary view have been populated and/or until all existing views have been exhausted or a prescribed threshold number of existing views have already been used.

In some embodiments, a requested arbitrary view may include some pixels that are not available from any existing views. In such cases, interpolation engine 116 is configured to populate any remaining pixels of the requested arbitrary view. In various embodiments, any one or more appropriate interpolation techniques may be employed by interpolation engine 116 to generate these unpopulated pixels in the requested arbitrary view. Examples of interpolation techniques that may be employed include, for instance, linear interpolation, nearest neighbor interpolation, etc. Interpolation of pixels introduces averaging or smoothing. Overall image quality may not be significantly affected by some interpolation, but excessive interpolation may introduce unacceptable blurriness. Thus, interpolation may be desired to be sparingly used. As previously described, interpolation is completely avoided if all pixels of the requested arbitrary view can be obtained from existing views. However, interpolation is introduced if the requested arbitrary view includes some pixels that are not available from any existing views. Generally, the amount of interpolation needed depends on the number of existing views available, the diversity of perspectives of the existing views, and/or how different the perspective of the arbitrary view is in relation to the perspectives of the existing views.

With respect to the example depicted in FIG. 2, seventy-three views around a chair object are stored as existing views of the chair. An arbitrary view around the chair object that is different or unique from any of the stored views may be generated using a plurality of these existing views, with preferably minimal, if any, interpolation. However, generating and storing such an exhaustive set of existing views may not be efficient or desirable. In some cases, a significantly smaller number of existing views covering a sufficiently diverse set of perspectives may instead be generated and stored. For example, the seventy-three views of the chair object may be decimated into a small set of a handful of views around the chair object.

As previously mentioned, in some embodiments, possible arbitrary views that may be requested may at least in part be constrained. For example, a user may be restricted from moving a virtual camera associated with an interactive scene to certain positions. With respect to the given example of FIG. 2, possible arbitrary views that may be requested may be limited to arbitrary positions around the chair object but may not, for example, include arbitrary positions under the chair object since insufficient pixel data exists for the bottom of the chair object. Such constraints on allowed arbitrary views ensure that a requested arbitrary view can be generated from existing data by arbitrary view generator 102.

Arbitrary view generator 102 generates and outputs the requested arbitrary view 108 in response to input arbitrary view request 104. The resolution or quality of the generated arbitrary view 108 is the same as or similar to the qualities of the existing views used to generate it since pixels from those views are used to generate the arbitrary view. Thus, using high definition existing views in most cases results in a high definition output. In some embodiments, the generated arbitrary view 108 is stored in database 106 with other existing views of the associated scene and may subsequently be employed to generate other arbitrary views of the scene in response to future requests for arbitrary views. In the cases in which input 104 comprises a request for an existing view in database 106, the requested view does not need to be generated from other views as described; instead, the requested view is retrieved via a simple database lookup and directly presented as output 108.

Arbitrary view generator 102 may furthermore be configured to generate an arbitrary ensemble view using the described techniques. That is, input 104 may comprise a request to combine a plurality of objects into a single custom view. In such cases, the aforementioned techniques are performed for each of the plurality of objects and combined to generate a single consolidated or ensemble view comprising the plurality of objects. Specifically, existing views of each of the plurality of objects are selected and retrieved from database 106 by asset management engine 110, the existing views are transformed into the perspective of the requested view by perspective transformation engine 112, pixels from the perspective-transformed existing views are used to populate corresponding pixels of the requested ensemble view by merging engine 114, and any remaining unpopulated pixels in the ensemble view are interpolated by interpolation engine 116. In some embodiments, the requested ensemble view may comprise a perspective that already exists for one or more objects comprising the ensemble. In such cases, the existing view of an object asset corresponding to the requested perspective is employed to directly populate pixels corresponding to the object in the ensemble view instead of first generating the requested perspective from other existing views of the object.

As an example of an arbitrary ensemble view comprising a plurality of objects, consider the chair object of FIG. 2 and an independently photographed or rendered table object. The chair object and the table object may be combined using the disclosed techniques to generate a single ensemble view of both objects. Thus, using the disclosed techniques, independently captured or rendered images or views of each of a plurality of objects can be consistently combined to generate a scene comprising the plurality of objects and having a desired perspective. As previously described, depth information of each existing view is known. The perspective transformation of each existing view includes a depth transformation, allowing the plurality of objects to be appropriately positioned relative to one another in the ensemble view.

Generating an arbitrary ensemble view is not limited to combining a plurality of single objects into a custom view. Rather, a plurality of scenes having multiple objects or a plurality of rich virtual environments may be similarly combined into a custom ensemble view. For example, a plurality of separately and independently generated virtual environments, possibly from different content generation sources and possibly having different existing individual perspectives, may be combined into an ensemble view having a desired perspective. Thus, generally, arbitrary view generator 102 may be configured to consistently combine or reconcile a plurality of independent assets comprising possibly different existing views into an ensemble view having a desired, possibly arbitrary perspective. A perfectly harmonious resulting ensemble view is generated since all combined assets are normalized to the same perspective. The possible arbitrary perspectives of the ensemble view may be constrained based on the existing views of the individual assets available to generate the ensemble view.

Figure 3:
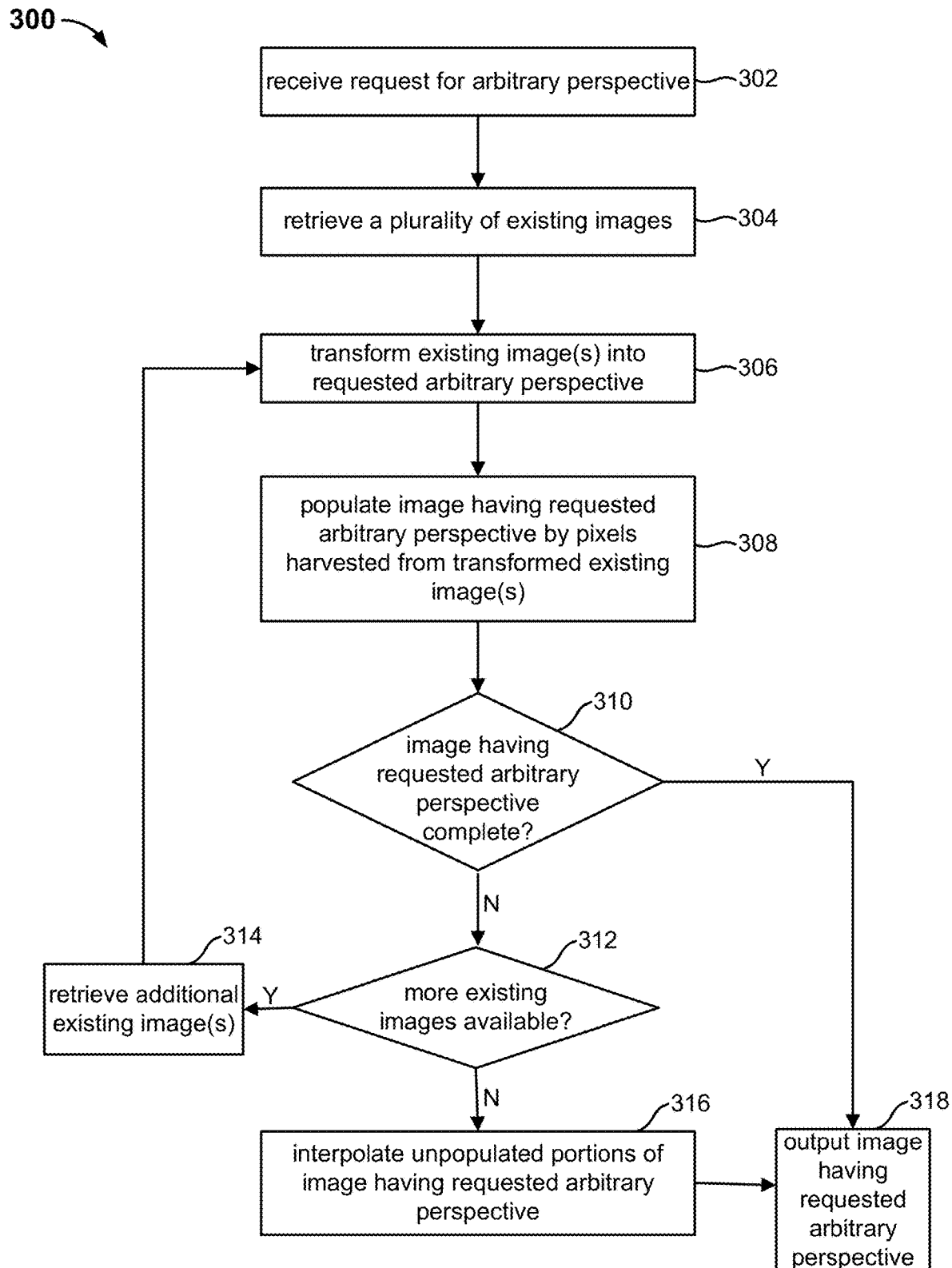
FIG. 3 is a flow chart illustrating an embodiment of a process for generating an arbitrary perspective.

FIG. 3 is a flow chart illustrating an embodiment of a process for generating an arbitrary perspective. Process 300 may be employed, for example, by arbitrary view generator 102 of FIG. 1. In various embodiments, process 300 may be employed to generate an arbitrary view of a prescribed asset or an arbitrary ensemble view.

Process 300 starts at step 302 at which a request for an arbitrary perspective is received. In some embodiments, the request received at step 302 may comprise a request for an arbitrary perspective of a prescribed scene that is different from any existing available perspectives of the scene. In such cases, for example, the arbitrary perspective request may be received in response to a requested change in perspective of a presented view of the scene. Such a change in perspective may be facilitated by changing or manipulating a virtual camera associated with the scene, such as by panning the camera, changing the focal length, changing the zoom level, etc. Alternatively, in some embodiments, the request received at step 302 may comprise a request for an arbitrary ensemble view. As one example, such an arbitrary ensemble view request may be received with respect to an application that allows a plurality of independent objects to be selected and provides a consolidated, perspective-corrected ensemble view of the selected objects.

At step 304, a plurality of existing images from which to generate at least a portion of the requested arbitrary perspective is retrieved from one or more associated assets databases. The plurality of retrieved images may be associated with a prescribed asset in the cases in which the request received at step 302 comprises a request for an arbitrary perspective of a prescribed asset or may be associated with a plurality of assets in the cases in which the request received at step 302 comprises a request for an arbitrary ensemble view.

At step 306, each of the plurality of existing images retrieved at step 304 that has a different perspective is transformed into the arbitrary perspective requested at step 302. Each of the existing images retrieved at step 304 includes associated perspective information. The perspective of each image is defined by the camera characteristics associated with generating that image such as relative position, orientation, rotation, angle, depth, focal length, aperture, zoom level, lighting information, etc. Since complete camera information is known for each image, the perspective transformation of step 306 comprises a simple mathematical operation. In some embodiments, step 306 also optionally includes a lighting transformation so that all images are consistently normalized to the same desired lighting conditions.

At step 308, at least a portion of an image having the arbitrary perspective requested at step 302 is populated by pixels harvested from the perspective-transformed existing images. That is, pixels from a plurality of perspective-corrected existing images are employed to generate an image having the requested arbitrary perspective.

At step 310, it is determined whether the generated image having the arbitrary perspective is complete. If it is determined at step 310 that the generated image having the requested arbitrary perspective is not complete, it is determined at step 312 whether any more existing images are available from which any remaining unpopulated pixels of the generated image may be mined. If it is determined at step 312 that more existing images are available, one or more additional existing images are retrieved at step 314, and process 300 continues at step 306.

If it is determined at step 310 that the generated image having the requested arbitrary perspective is not complete and if it is determined at step 312 that no more existing images are available, any remaining unpopulated pixels of the generated image are interpolated at step 316. Any one or more appropriate interpolation techniques may be employed at step 316.

If it is determined at step 310 that the generated image having the requested arbitrary perspective is complete or after interpolating any remaining unpopulated pixels at step 316, the generated image having the requested arbitrary perspective is output at step 318. Process 300 subsequently ends.

As described, the disclosed techniques may be used to generate an arbitrary perspective based on other existing perspectives. Normalizing different existing perspectives into a common, desired perspective is possible since camera information is preserved with each existing perspective. A resulting image having the desired perspective can be constructed from mining pixels from perspective-transformed existing images. The processing associated with generating an arbitrary perspective using the disclosed techniques is not only fast and nearly instantaneous but also results in a high quality output, making the disclosed techniques particularly powerful for interactive, real-time graphics applications.

The disclosed techniques furthermore describe the generation of an arbitrary ensemble view comprising a plurality of objects by using available images or views of each of the plurality of objects. As described, perspective transformation and/or normalization allow pixels comprising independently captured or rendered images or views of the plurality of objects to be consistently combined into a desired arbitrary ensemble view.

In some embodiments, it may be desirable to first build or assemble a scene or ensemble view by selecting and positioning content desired to be included in the scene or ensemble view. In some such cases, a plurality of objects may be stacked or combined like building blocks to create a composite object comprising a scene or ensemble view. As an example, consider an interactive application in which a plurality of independent objects are selected and appropriately placed, e.g., on a canvas, to create a scene or ensemble view. The interactive application, for instance, may comprise a visualization or modeling application. In such an application, arbitrary views of objects cannot be employed to construct a scene or ensemble view due to perspective distortions arising from associated focal lengths. Rather, prescribed object views that are substantially free of perspective distortion are employed as described next.

Orthographic views of objects are in some embodiments employed to model or define a scene or ensemble view comprising a plurality of independent objects. An orthographic view comprises a parallel projection that is approximated by a (virtual) camera positioned at a large distance relative to its size from the subject of interest and having a relatively long focal length so that rays or projection lines are substantially parallel. Orthographic views comprise no or fixed depths and hence no or little perspective distortions. As such, orthographic views of objects may be employed similarly to building blocks when specifying an ensemble scene or a composite object. After an ensemble scene comprising an arbitrary combination of objects is specified or defined using such orthographic views, the scene or objects thereof may be transformed into any desired camera perspective using the arbitrary view generation techniques previously described with respect to the description of FIGS. 1-3.

In some embodiments, the plurality of views of an asset stored in database 106 of system 100 of FIG. 1 includes one or more orthographic views of the asset. Such orthographic views may be captured (e.g., photographed or scanned) or rendered from a three-dimensional polygon mesh model. Alternatively, an orthographic view may be generated from other views of an asset available in database 106 according to the arbitrary view generation techniques described with respect to the description of FIGS. 1-3.

Figure 4A:
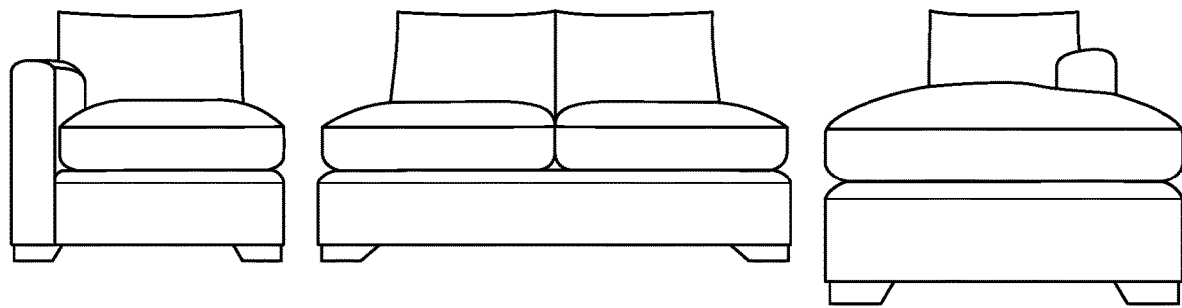
FIGS. 4A-4N illustrate examples of an embodiment of an application in which independent objects are combined to generate an ensemble or composite object.
Figure 4B:
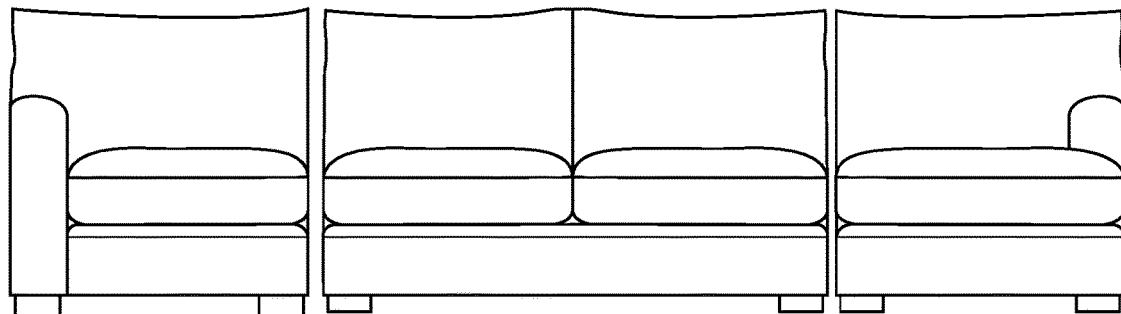
Figure 4C:
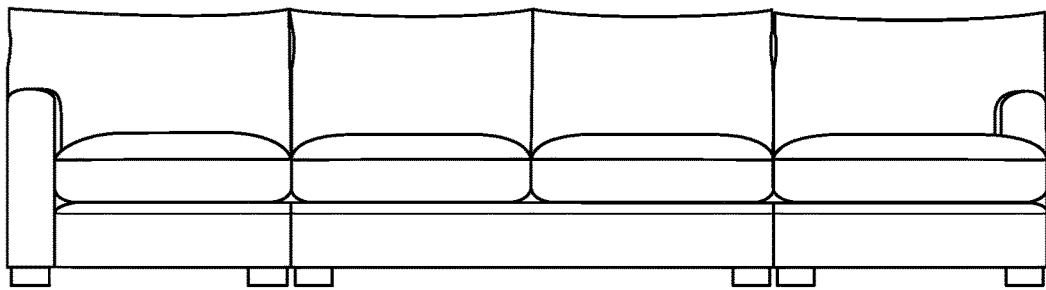
Figure 4D:
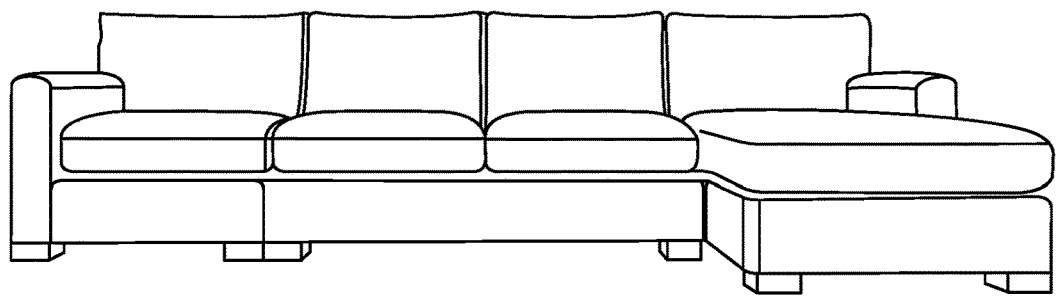
Figure 4E:
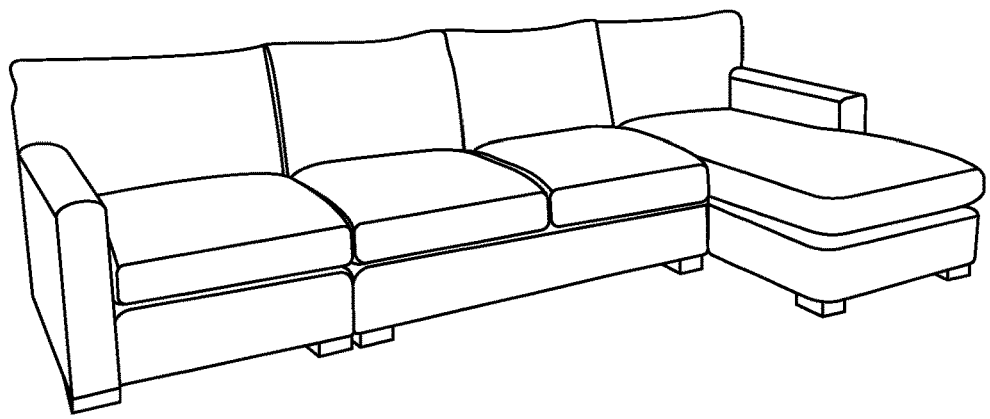
Figure 4F:
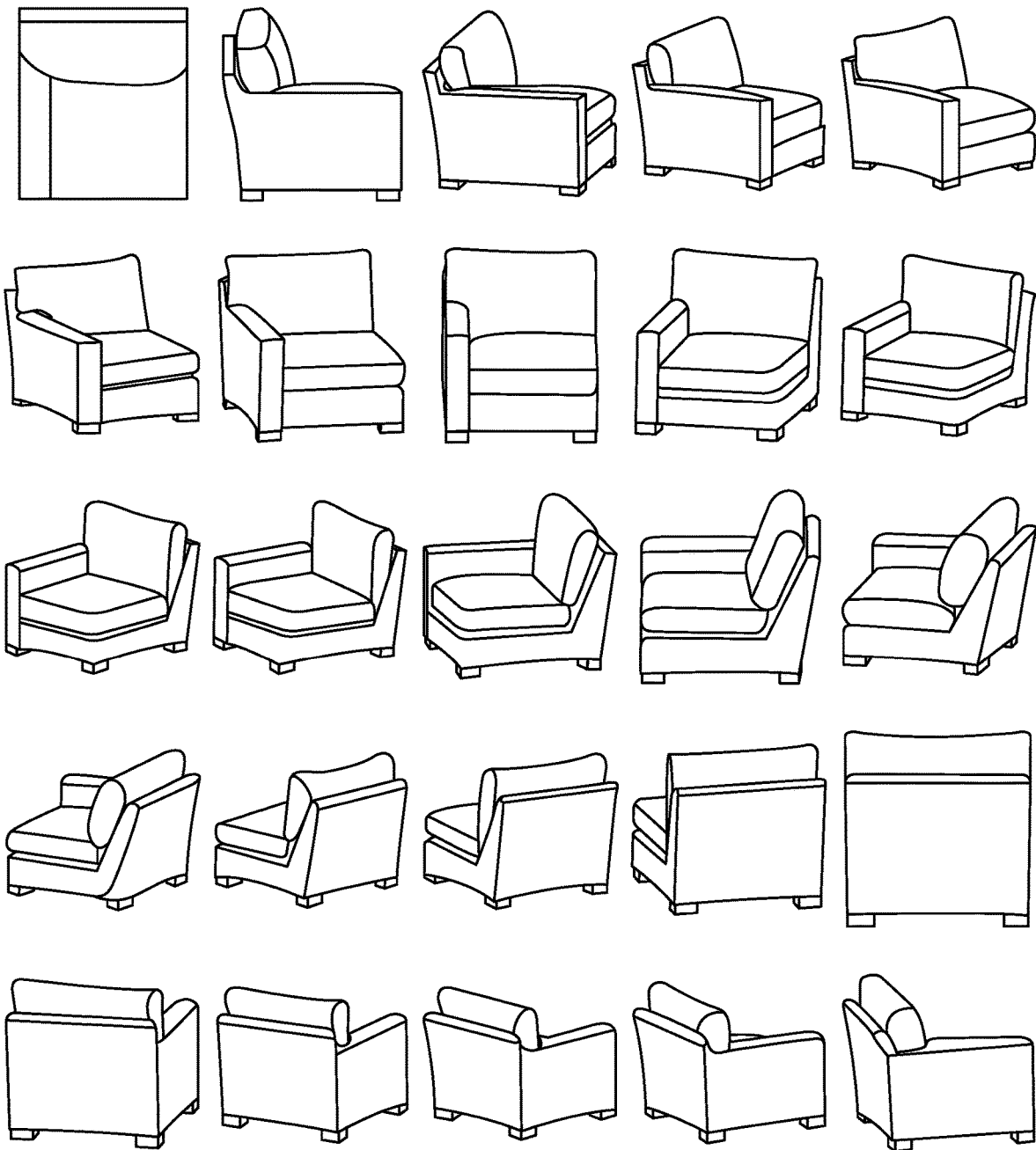
Figure 4G:
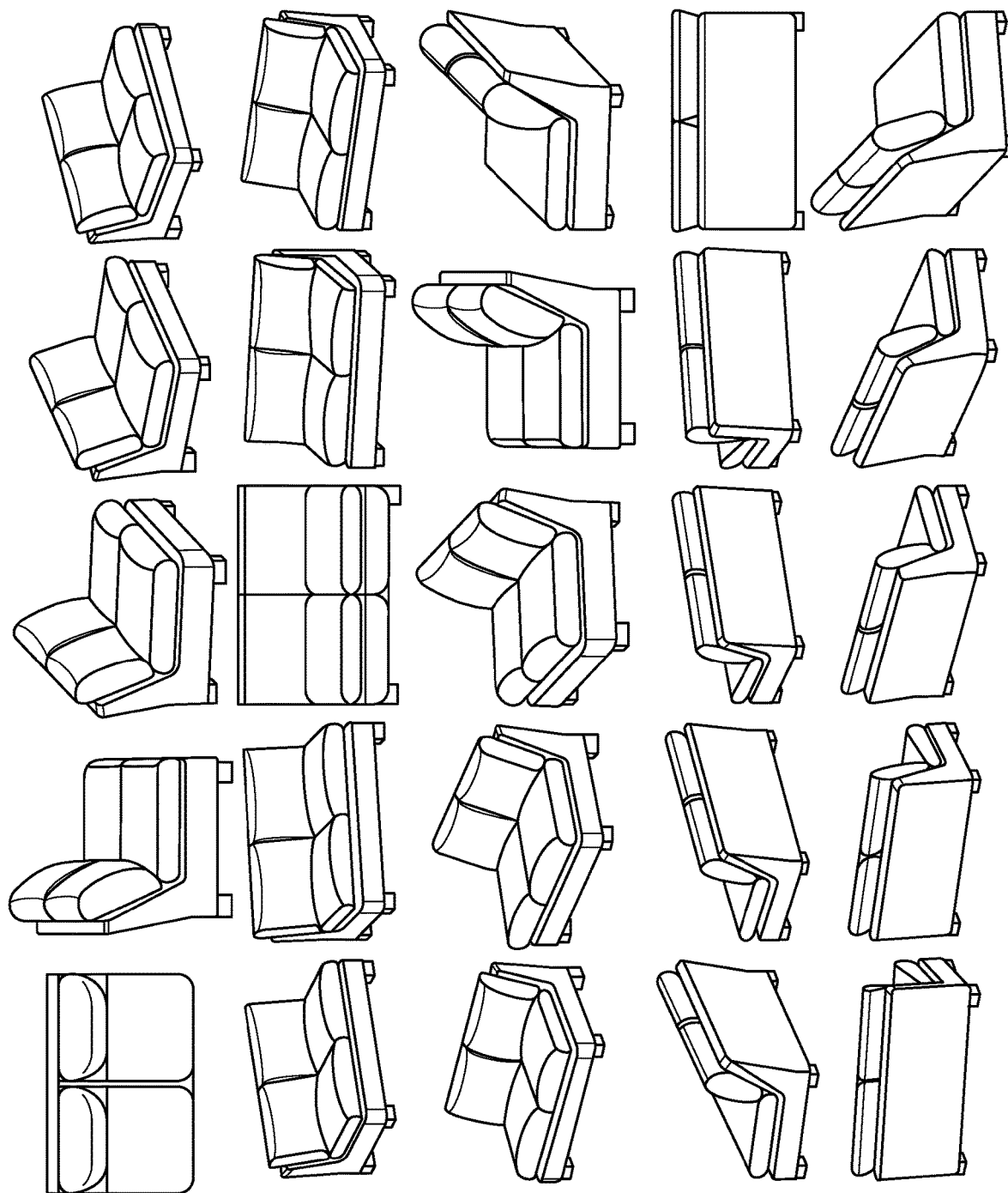
Figure 4H:
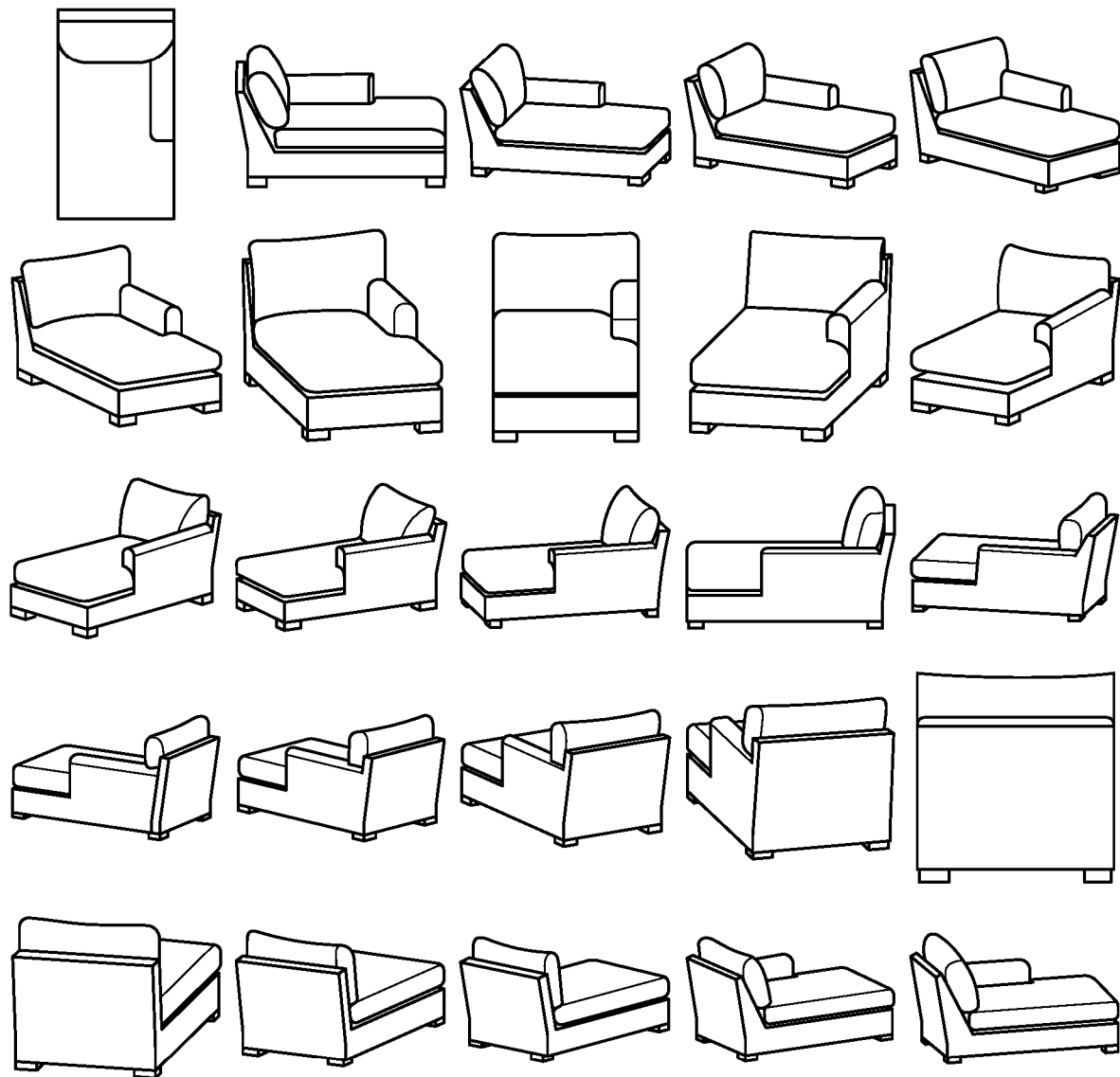
Figure 4I:
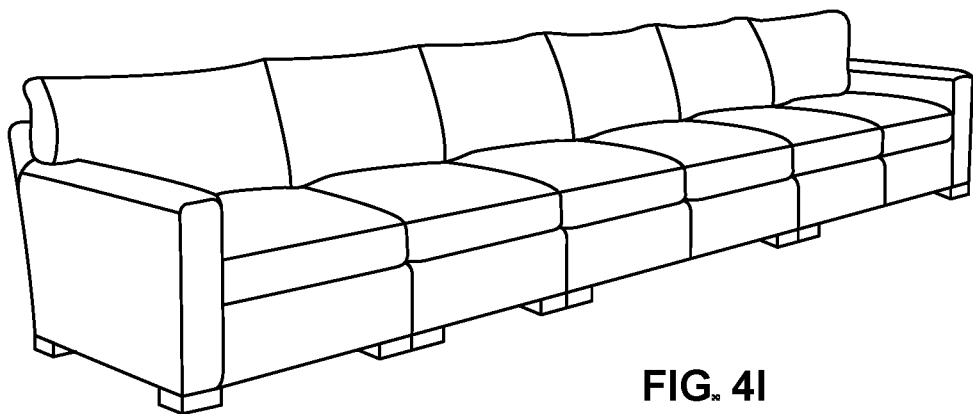
Figure 4J:
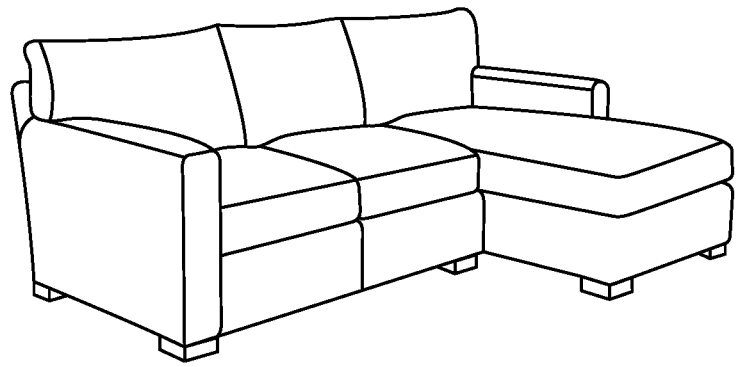
Figure 4K:
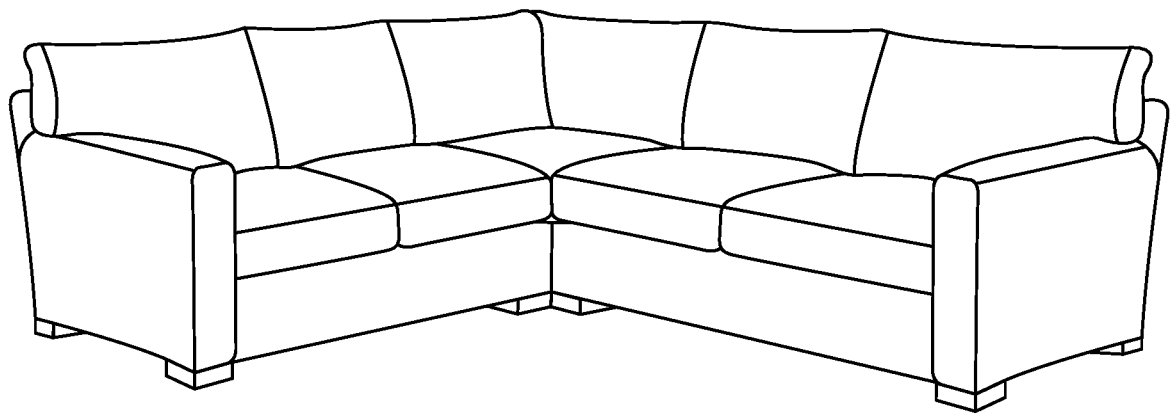
Figure 4L:
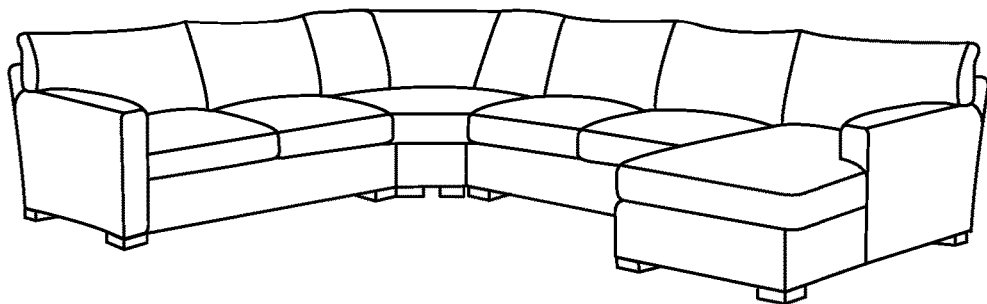
Figure 4M:
Figure 4N:
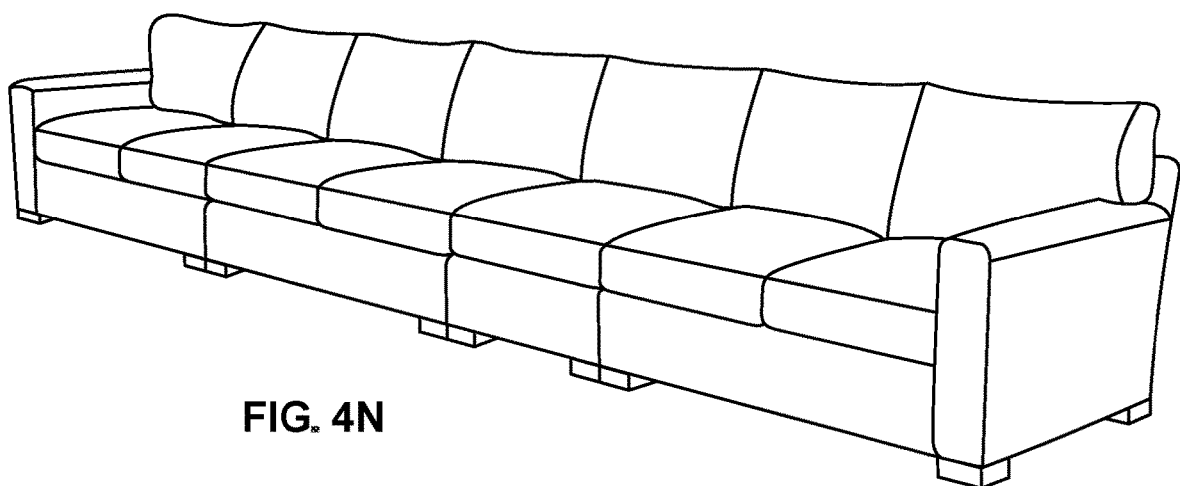

FIGS. 4A-4N illustrate examples of an embodiment of an application in which independent objects are combined to generate an ensemble or composite object or scene. Specifically, FIGS. 4A-4N illustrate an example of a furniture building application in which various independent seating components are combined to generate different sectional configurations.

FIG. 4A illustrates an example of perspective views of three independent seating components—a left-arm chair, an armless loveseat, and a right-arm chaise. The perspective views in the example of FIG. 4A each have a focal length of 25 mm. As can be seen, the resulting perspective distortions prevent stacking of the components next to each other, i.e., side-by-side placement of the components, which may be desired when building a sectional configuration comprising the components.

FIG. 4B illustrates an example of orthographic views of the same three components of FIG. 4A. As depicted, the orthographic views of the objects are modular or block-like and amenable to being stacked or placed side-by-side. However, depth information is substantially lost in the orthographic views. As can be seen, all three components appear to have the same depth in the orthographic views despite the actual differences in depth that are visible in FIG. 4A, especially with respect to the chaise.

FIG. 4C illustrates an example of combining the orthographic views of the three components of FIG. 4B to specify a composite object. That is, FIG. 4C shows the generation of an orthographic view of a sectional via side-by-side placement of the orthographic views of the three components of FIG. 4B. As depicted in FIG. 4C, the bounding boxes of the orthographic views of the three seating components fit perfectly next to each other to create the orthographic view of the sectional. That is, the orthographic views of the components facilitate user friendly manipulations of the components in a scene as well as accurate placement.

FIGS. 4D and 4E each illustrate an example of transforming the orthographic view of the composite object of FIG. 4C to an arbitrary camera perspective using the arbitrary view generation techniques previously described with respect to the description of FIGS. 1-3. That is, the orthographic view of the composite object is transformed into a normal camera perspective that accurately portrays depth in each of the examples of FIGS. 4D and 4E. As depicted, the relative depth of the chaise with respect to the chair and loveseat that was lost in the orthographic views is visible in the perspective views of FIGS. 4D and 4E.

FIGS. 4F, 4G, and 4H illustrate examples of a plurality of orthographic views of the left-arm chair, armless loveseat, and right-arm chaise, respectively. As previously described, any number of different views or perspectives of an asset may be stored in database 106 of system 100 of FIG. 1. The sets of FIGS. 4F-4H include twenty-five orthographic views corresponding to different angles around each asset that are independently captured or rendered and stored in database 106 and from which any arbitrary view of any combination of objects may be generated. In furniture building applications, for instance, the top views may be useful for ground placement while the front views may be useful for wall placement. In some embodiments, in order to maintain a more compact reference data set, only a prescribed number of orthographic views are stored for an asset in database 106 from which any arbitrary view of the asset may be generated.

FIGS. 4I-4N illustrate various examples of generating arbitrary views or perspectives of arbitrary combinations of objects. Specifically, each of FIGS. 4I-4N illustrates generating an arbitrary perspective or view of a sectional comprising a plurality of independent seating objects or components. Each arbitrary view may be generated, for example, by transforming one or more orthographic (or other) views of the objects comprising an ensemble view or composite object to the arbitrary view and harvesting pixels to populate the arbitrary view and possibly interpolating any remaining missing pixels using the arbitrary view generation techniques previously described with respect to the description of FIGS. 1-3.

As previously described, each image or view of an asset in database 106 may be stored with corresponding metadata such as relative object and camera location and orientation information as well as lighting information. Metadata may be generated when rendering a view from a three-dimensional polygon mesh model of an asset, when imaging or scanning the asset (in which case depth and/or surface normal data may be estimated), or a combination of both.

A prescribed view or image of an asset comprises pixel intensity values (e.g., RGB values) for each pixel comprising the image as well as various metadata parameters associated with each pixel. In some embodiments, one or more of the red, green, and blue (RGB) channels or values of a pixel may be employed to encode the pixel metadata. The pixel metadata, for example, may include information about the relative location or position (e.g., x, y, and z coordinate values) of the point in three-dimensional space that projects at that pixel. Furthermore, the pixel metadata may include information about surface normal vectors (e.g., angles made with the x, y, and z axes) at that position. Moreover, the pixel metadata may include texture mapping coordinates (e.g., u and v coordinate values). In such cases, an actual pixel value at a point is determined by reading the RGB values at the corresponding coordinates in a texture image.

The surface normal vectors facilitate modifying or varying the lighting of a generated arbitrary view or scene. More specifically, re-lighting a scene comprises scaling pixel values based on how well the surface normal vectors of the pixels match the direction of a newly added, removed, or otherwise altered light source, which may at least in part be quantified, for example, by the dot product of the light direction and normal vectors of the pixels. Specifying pixel values via texture mapping coordinates facilitates modifying or varying the texture of a generated arbitrary view or scene or part thereof. More specifically, the texture can be changed by simply swapping or replacing a referenced texture image with another texture image having the same dimensions.

The disclosed arbitrary view generation techniques are effectively based on relatively low computational cost perspective transformations and/or lookup operations. An arbitrary (ensemble) view may be generated by simply selecting the correct pixels and appropriately populating the arbitrary view being generated with those pixels. In some cases, pixel values may optionally be scaled, e.g., if lighting is being adjusted. The low storage and processing overhead of the disclosed techniques facilitate fast, real-time or on-demand generation of arbitrary views of complex scenes that are of comparable quality to the high definition reference views from which they are generated.

As described, assembling an ensemble or composite object or scene in some embodiments includes specifying a plurality of objects or assets comprising the ensemble using orthographic views. Orthographic views facilitate accurate placements and alignments of the plurality of objects or assets in the ensemble scene. An orthographic view of the ensemble scene may then be transformed into any arbitrary camera perspective to generate, for example, any desired or requested perspective. Transforming the ensemble view into a prescribed camera perspective may comprise individually transforming each of the plurality of objects or assets comprising the ensemble scene into the prescribed perspective using the previously described techniques. While the previously described techniques for generating an arbitrary ensemble view are relatively efficient, even more efficiency may be desirable in certain applications in which it is advantageous to almost instantly, or at least very quickly, generate an output with a latency penalty that is almost undetectable to an end user, e.g., such as in applications that provide users interactive, real-time experiences.

In some embodiments, further improvements in efficiency may at least in part be facilitated by eliminating the processing associated with transforming (e.g., an orthographic or other view of) most of the plurality of objects or assets comprising an ensemble scene into a prescribed arbitrary perspective. Instead, an available existing view of an object or asset that is closest or nearest to the prescribed arbitrary perspective for a prescribed position and orientation of that object or asset in the ensemble scene is employed for that object or asset when generating an output ensemble view or image that represents the prescribed arbitrary perspective. In most cases, the resulting output ensemble view is not completely perspective correct but provides a suitable approximation that is acceptable for many applications and is generated with significantly less latency relative to generating a completely perspective correct output. Generating such an approximation of an arbitrary ensemble view for an arbitrary camera pose by employing a maximally quantized subset of already existing reference views of one or more objects or assets comprising the ensemble is next described in further detail.

Figure 5:
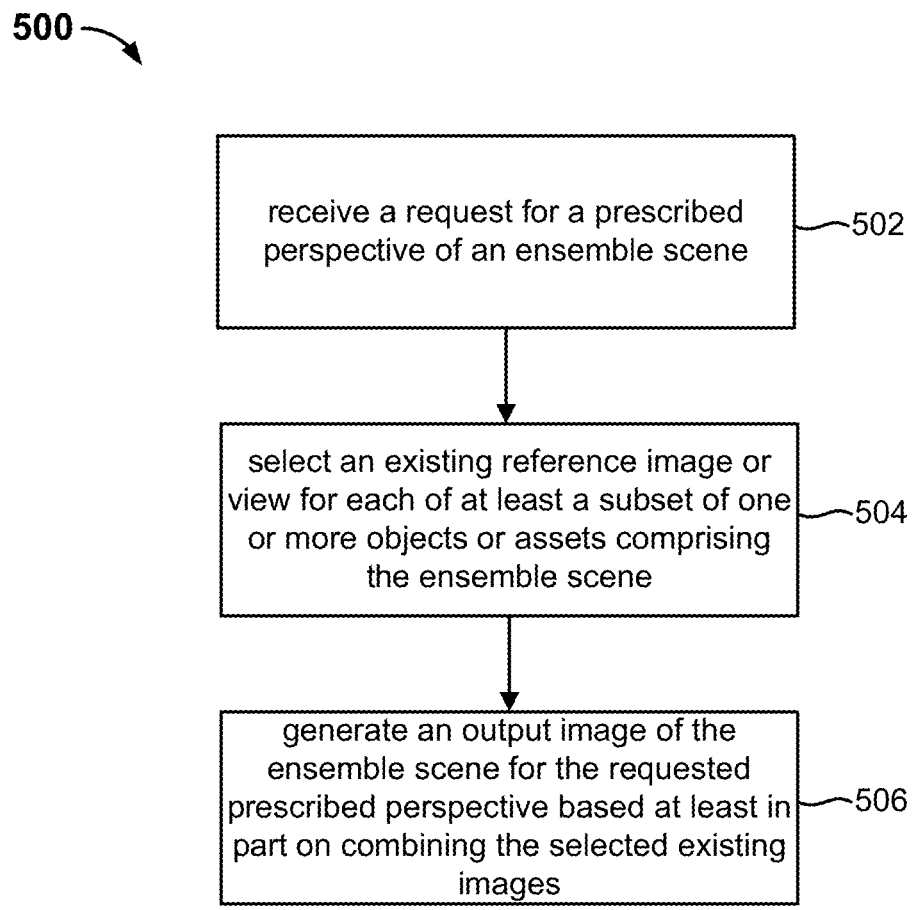
FIG. 5 is a flow chart illustrating an embodiment of a process for generating an arbitrary ensemble view.

FIG. 5 is a high level flow chart illustrating an embodiment of a process for generating an arbitrary ensemble view. In some embodiments, process 500 is employed to efficiently generate an output image of an ensemble scene based at least in part on appropriately combining or compositing a single best matching existing view of at least one or more, if not most or all, objects or assets comprising the ensemble scene.

Process 500 starts at step 502 at which a request for a prescribed perspective of an ensemble scene is received. The requested prescribed perspective of the ensemble scene comprises a selected or otherwise specified camera perspective or pose with respect to the ensemble scene and generally may comprise any arbitrary view. An arbitrary view in the given context comprises any desired view or perspective of a scene whose specification or camera pose is not known in advance prior to being requested. An ensemble scene comprises a combined view of a plurality of independent objects or assets. Generally, a specification of an independent object or asset comprises a set of existing reference images or views of the individual object or asset having different camera perspectives and corresponding metadata, one or more of which may be used to generate or specify a portion of the ensemble scene associated with that object or asset. In some embodiments, the request of step 502 is received from an interactive mobile or web-based application that facilitates manipulation of camera angle or pose in an ensemble scene space and/or placement of a plurality of objects or assets to create a composite or ensemble scene. For example, the request may be received from a visualization or modeling application or an augmented reality (AR) application. In some embodiments, the request of step 502 is received with respect to an orthographic view of the ensemble scene since orthographic views facilitate easier manipulation, placement, and alignment of a plurality of objects or assets that comprise the ensemble scene.

At step 504, a nearest or closest matching existing reference image or view is selected for each of at least a subset of one or more objects or assets comprising the ensemble scene. Step 504 may be performed serially and/or in parallel for individual or independent objects or assets comprising the ensemble scene. In some embodiments, only one or a single existing reference image or view is selected for an object or asset that best matches the requested prescribed perspective for a given pose of that object or asset in the ensemble scene space. The ensemble scene space comprises an ensemble scene coordinate system with a prescribed origin defined in an appropriate manner such as at the center (e.g., center of mass) of the ensemble scene. In order to select the closest matching existing reference image or view for an object or asset comprising the ensemble scene at step 504, the position and orientation or pose of that object or asset with respect to the ensemble scene coordinate system is determined and then translated or converted or otherwise correlated to an equivalent pose in its individual coordinate system that is associated with the existing reference images or views of that object or asset. Thus, a simple camera metrics calculation having a relatively low computational complexity is performed based on the requested perspective and relative object or asset pose in the ensemble scene so that a closest matching existing reference image or view can be selected at step 504.

One or more criteria and/or thresholds may be defined to determine or identify the closest matching existing reference image or view for an object or asset. In some cases, an existing reference image or view is selected at step 504 only if one or more such thresholds are satisfied. In an ideal case, an exact match is found and selected at step 504. In some cases, however, one or more selection criteria and/or thresholds may not be satisfied if an available existing reference image dataset is too incomplete, such as when the available existing reference images or views of an object or asset are appreciably different from the requested perspective or if no reference images or views are available for the object or asset. In some such cases, a closest matching placeholder or ghost image or view of the object or asset is instead selected at step 504. Such a placeholder image or view represents the shape of the object or asset but lacks other attributes such as texture and optical properties. In some embodiments, a set of placeholder images that spans a sufficiently dense set of possible views around an object or asset (e.g., that includes angles covering 360 degrees around the object or asset) is generated and stored for each unique object shape using a relatively low computational complexity rendering technique. Placeholders are then employed when fully rendered versions of an object or asset are unavailable or exhibit unacceptable deviations from the requested perspective.

At step 506, an output image of the ensemble scene is generated for the requested prescribed perspective at least in part by appropriately combining or compositing the closest matching existing reference images or views of objects or assets comprising the ensemble scene that were selected at step 504. Step 506 may include appropriately scaling or resizing a closest matching existing reference image or view selected for an object or asset and/or determining a location or position in the ensemble view at which to paste or composite the closest matching existing reference image or view selected for the object or asset. In most cases, the generated output image of the ensemble scene closely approximates the requested prescribed perspective. Since most objects or assets comprising the ensemble scene are represented in the output image with their nearest or closest available existing poses, these objects or assets are not completely perspective correct because they are not rigorously rendered or generated. That is, in most cases, these objects or assets do not have the requested prescribed perspective in the output image unless an exact match is found in the available existing images or views. The vanishing points of such objects or assets do not all converge at the same point in the output image, but the objects or assets are offset or skewed by an amount that in most cases is small enough (e.g., a few degrees) to trick the human visual system into perceiving the output image as perspective correct for the most part.

Consistency in the output image of the ensemble scene is furthermore facilitated by generating at least some portions of the ensemble scene in a globally consistent or similar manner, which further facilitates human interpretation of the output image as substantially visually accurate. For example, one or more objects or assets comprising the ensemble scene and/or (flat or other) surfaces, structural elements, global features, etc., comprising the ensemble scene may be rendered or generated rigorously to be correct in perspective, i.e., to have the requested prescribed perspective and not an approximation of the requested perspective. For instance, if the ensemble scene comprises a space such as a room, the walls, ceiling, floor, rugs, wall hangings, etc., may be generated using the camera pose of the requested perspective and thus may accurately be represented in the output image of the ensemble scene generated at step 506. Moreover, the output image of the ensemble scene may comprise a global lighting location that affects all portions of the scene in a similar and consistent manner, e.g., when relighting using available metadata such as surface normal vectors. Thus, by generating some portions of an ensemble view in a global or perspective corrective manner and representing most independent objects comprising the ensemble view as best approximations, an output is generated that in many cases is mostly indiscernible from a completely perspective correct version. In some cases, some skew may be visible but may still be acceptable for certain applications in which a completely precise view is not necessary, such as mood board applications or space/room planning applications in which a designer or user benefits from viewing an ensemble of objects or assets together regardless of exact perspective. Nevertheless, as the repository or database of available existing images or views grows over time, the disclosed techniques will continue to generate outputs that more and more precisely represent the requested prescribed perspective. In an optimal case, exact matches are found for all objects or assets and used to generate an output image that actually has the requested prescribed perspective rather than being an approximation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a request for a prescribed perspective of an ensemble scene comprising a plurality of assets; and
generating an output image of the ensemble scene for the requested prescribed perspective based at least in part on combining at least a portion of an existing image of each of at least a subset of the plurality of assets.

2. The method of claim 1, wherein generating the output image of the ensemble scene comprises generating a view of at least one asset of the plurality of assets that has the requested prescribed perspective.

3. The method of claim 2, wherein the view is generated using a plurality of existing images of the at least one asset.

4. The method of claim 1, wherein generating the output image of the ensemble scene comprises generating at least one portion of the ensemble scene to have the requested prescribed perspective.

5. The method of claim 4, wherein the at least one portion comprises a surface of the ensemble scene.

6. The method of claim 4, wherein the at least one portion comprises a structural element of the ensemble scene.

7. The method of claim 4, wherein the at least one portion comprises a global feature of the ensemble scene.

8. The method of claim 1, further comprising globally relighting the generated output image of the ensemble scene.

9. The method of claim 1, wherein the output image comprises a frame of a video sequence.

10. The method of claim 1, wherein the request is received with respect to an orthographic view of the ensemble scene.

11. The method of claim 10, wherein the orthographic view of the ensemble scene comprises combined orthographic views of the plurality of assets.

12. The method of claim 1, further comprising selecting the existing image of each of the at least subset of the plurality of assets.

13. The method of claim 12, wherein selecting comprises selecting based on a pose of an associated asset in the ensemble scene.

14. The method of claim 12, wherein selecting comprises selecting a rotated existing image of an associated asset.

15. The method of claim 12, wherein selecting comprises selecting an exact match to the requested prescribed perspective.

16. The method of claim 12, wherein selecting comprises selecting a nearest or closest available match to the requested prescribed perspective.

17. The method of claim 12, wherein selecting comprises selecting a nearest or closest available match to the requested prescribed perspective based on a pose of an associated asset in the ensemble scene.

18. The method of claim 1, wherein combining comprising compositing.

19. The method of claim 1, wherein generating the output image of the ensemble scene comprises scaling at least the portion of the existing image of one or more of the subset of assets.

20. The method of claim 1, wherein generating the output image of the ensemble scene comprises resizing at least the portion of the existing image of one or more of the subset of assets.

21. The method of claim 1, wherein generating the output image of the ensemble scene comprises determining a position at which to include at least the portion of the existing image of each of at least the subset of assets in the ensemble scene.

22. The method of claim 1, wherein the output image of the ensemble scene comprises an approximation of the requested prescribed perspective.

23. The method of claim 1, wherein combining at least a portion of an existing image of each of at least a subset of the plurality of assets comprises combining a single existing image of each of at least the subset of the plurality of assets.

24. A system, comprising:
a processor configured to:
receive a request for a prescribed perspective of an ensemble scene comprising a plurality of assets; and
generate an output image of the ensemble scene for the requested prescribed perspective based at least in part on combining at least a portion of an existing image of each of at least a subset of the plurality of assets; and
a memory coupled to the processor and configured to provide the processor with instructions.

25. The system of claim 24, wherein to generate the output image of the ensemble scene comprises to generate a view of at least one asset of the plurality of assets that has the requested prescribed perspective.

26. The system of claim 25, wherein the view is generated using a plurality of existing images of the at least one asset.

27. The system of claim 24, wherein to generate the output image of the ensemble scene comprises to generate at least one portion of the ensemble scene to have the requested prescribed perspective.

28. The system of claim 27, wherein the at least one portion comprises a surface of the ensemble scene.

29. The system of claim 27, wherein the at least one portion comprises a structural element of the ensemble scene.

30. The system of claim 27, wherein the at least one portion comprises a global feature of the ensemble scene.

31. The system of claim 24, wherein the processor is further configured to globally relight the generated output image of the ensemble scene.

32. The system of claim 24, wherein the output image comprises a frame of a video sequence.

33. The system of claim 24, wherein the request is received with respect to an orthographic view of the ensemble scene.

34. The system of claim 33, wherein the orthographic view of the ensemble scene comprises combined orthographic views of the plurality of assets.

35. The system of claim 24, wherein the processor is further configured to select the existing image of each of the at least subset of the plurality of assets.

36. The system of claim 35, wherein to select comprises to select based on a pose of an associated asset in the ensemble scene.

37. The system of claim 35, wherein to select comprises to select a rotated existing image of an associated asset.

38. The system of claim 35, wherein to select comprises to select an exact match to the requested prescribed perspective.

39. The system of claim 35, wherein to select comprises to select a nearest or closest available match to the requested prescribed perspective.

40. The system of claim 35, wherein to select comprises to select a nearest or closest available match to the requested prescribed perspective based on a pose of an associated asset in the ensemble scene.

41. The system of claim 24, wherein combining comprising compositing.

42. The system of claim 24, wherein to generate the output image of the ensemble scene comprises to scale at least the portion of the existing image of one or more of the subset of assets.

43. The system of claim 24, wherein to generate the output image of the ensemble scene comprises to resize at least the portion of the existing image of one or more of the subset of assets.

44. The system of claim 24, wherein to generate the output image of the ensemble scene comprises to determine a position at which to include at least the portion of the existing image of each of at least the subset of assets in the ensemble scene.

45. The system of claim 24, wherein the output image of the ensemble scene comprises an approximation of the requested prescribed perspective.

46. The system of claim 24, wherein combining at least a portion of an existing image of each of at least a subset of the plurality of assets comprises combining a single existing image of each of at least the subset of the plurality of assets.

47. A computer program product embodied in a non-transitory computer readable storage medium and comprising computer instructions which when executed cause a computer to:
receive a request for a prescribed perspective of an ensemble scene comprising a plurality of assets; and
generate an output image of the ensemble scene for the requested prescribed perspective based at least in part on combining at least a portion of an existing image of each of at least a subset of the plurality of assets.

48. The computer program product of claim 47, wherein to generate the output image of the ensemble scene comprises to generate a view of at least one asset of the plurality of assets that has the requested prescribed perspective.

49. The computer program product of claim 48, wherein the view is generated using a plurality of existing images of the at least one asset.

50. The computer program product of claim 47, wherein to generate the output image of the ensemble scene comprises to generate at least one portion of the ensemble scene to have the requested prescribed perspective.

51. The computer program product of claim 50, wherein the at least one portion comprises a surface of the ensemble scene.

52. The computer program product of claim 50, wherein the at least one portion comprises a structural element of the ensemble scene.

53. The computer program product of claim 50, wherein the at least one portion comprises a global feature of the ensemble scene.

54. The computer program product of claim 47, further comprising computer instructions which when executed cause a computer to globally relight the generated output image of the ensemble scene.

55. The computer program product of claim 47, wherein the output image comprises a frame of a video sequence.

56. The computer program product of claim 47, wherein the request is received with respect to an orthographic view of the ensemble scene.

57. The computer program product of claim 56, wherein the orthographic view of the ensemble scene comprises combined orthographic views of the plurality of assets.

58. The computer program product of claim 47, further comprising computer instructions which when executed cause a computer to select the existing image of each of the at least subset of the plurality of assets.

59. The computer program product of claim 58, wherein to select comprises to select based on a pose of an associated asset in the ensemble scene.

60. The computer program product of claim 58, wherein to select comprises to select a rotated existing image of an associated asset.

61. The computer program product of claim 58, wherein to select comprises to select an exact match to the requested prescribed perspective.

62. The computer program product of claim 58, wherein to select comprises to select a nearest or closest available match to the requested prescribed perspective.

63. The computer program product of claim 58, wherein to select comprises to select a nearest or closest available match to the requested prescribed perspective based on a pose of an associated asset in the ensemble scene.

64. The computer program product of claim 47, wherein combining comprising compositing.

65. The computer program product of claim 47, wherein to generate the output image of the ensemble scene comprises to scale at least the portion of the existing image of one or more of the subset of assets.

66. The computer program product of claim 47, wherein to generate the output image of the ensemble scene comprises to resize at least the portion of the existing image of one or more of the subset of assets.

67. The computer program product of claim 47, wherein to generate the output image of the ensemble scene comprises to determine a position at which to include at least the portion of the existing image of each of at least the subset of assets in the ensemble scene.

68. The computer program product of claim 47, wherein the output image of the ensemble scene comprises an approximation of the requested prescribed perspective.

69. The computer program product of claim 47, wherein combining at least a portion of an existing image of each of at least a subset of the plurality of assets comprises combining a single existing image of each of at least the subset of the plurality of assets.

* * * * *